United States Patent [19]

Uchikawa et al.

[11] 3,947,283
[45] Mar. 30, 1976

[54] METHOD FOR SOLIDIFYING SLUDGE

[75] Inventors: Hiroshi Uchikawa, Funabashi; Masao Shimoda, Tokyo, both of Japan

[73] Assignee: Onoda Cement Company, Limited, Yamaguchi, Japan

[22] Filed: July 24, 1974

[21] Appl. No.: 491,347

[30] Foreign Application Priority Data
Aug. 16, 1973 Japan................................ 48-91312

[52] U.S. Cl. .................... 106/89; 106/104; 106/315
[51] Int. Cl.$^2$......................... C04B 7/02; C04B 7/35
[58] Field of Search ................ 106/89, 90, 104, 315

[56] References Cited
UNITED STATES PATENTS

| 3,720,609 | 3/1973 | Smith et al............................ 210/59 |
| --- | --- | --- |
| 3,864,138 | 2/1975 | Uchikawa et al.................. 106/315 |
| 3,864,141 | 2/1975 | Uchikawa et al..................... 106/90 |

FOREIGN PATENTS OR APPLICATIONS

| 21,793 | 7/1970 | Japan..................................... 210/42 |
| --- | --- | --- |
| 31,869 | 11/1972 | Japan..................................... 210/46 |

*Primary Examiner*—Patrick P. Garvin
*Assistant Examiner*—John P. Sheehan
*Attorney, Agent, or Firm*—Oblon, Fisher, Spivak, McClelland & Maier

[57] ABSTRACT

A sludge having a water/solid high ratio and containing a substance having a harmful influence upon the setting of portland cement is solidified by mixing the sludge with rapid hardening cement containing calcium haloaluminate.

3 Claims, No Drawings

METHOD FOR SOLIDIFYING SLUDGE

BACKGROUND OF THE INVENTION

This invention relates to an improved method for a solidifying sludge.

Throughout this invention, the "sludge" means a sludge which had a water/solid high ratio and contained a substance having a harmful influence upon the setting of portland cement or cement composed of portland cement ground, for example, 1) a sand, a silt, a clay or colloidal particles which settled on the bottom of a river, a marsh, a lake, a harbor or a bay and contained an organic compound such as a sugar; a cracked petroleum substance; a fat; a humic substance; an oxide, a sulfide, a chloride or a hydroxide of copper, lead, zinc and the like; phosphonic acid; an inorganic phosphate or an organic phosphorus compound such as parathion; 2) a mud which contained various kind of substances which were discharged from a metal mine.

It has been hitherto widely applied to solidify the sludge in the presence of water by mixing portland cement or cement composed of portland cement ground such as normal portland cement, high early strength portland cement and super high early strength portland cement and mixed portland cement such as silica cement and blast furnace slug cement (hereinafter abridged to portland cement) to the sludge. However, the organic compounds such as a sugar; a cracked petroleum substance; a fat; a humic substance; an oxide, a sulfide, a chloride, a hydroxide of copper, lead, zinc and the like (hereinafter an inorganic compound of copper, lead, zinc and the like); phosphoric acid, an inorganic phosphate, an organic phosphorus compound such as parathion (hereinafter abridged to a phosphorus compound) have harmful influences upon the setting of the above portland cement. Accordingly, the sludge containing such a substance can not be solidified by mixing the above portland cement. Even if the sludge may be solidified by mixing the portland cement, the hardened body will become flimsy with lapse of time and be broken down finally.

One object of this invention is to solidify the sludge in a short time.

Another object of this invention is to provide a solidified body which is stable for long times.

These objects can be attained by adding rapid hardening cement containing calcium haloaluminate, ($11CaO \cdot 7Al_2O_3 \cdot CaX_2$, X shows halogen atom).

The accurate action of the rapid hardening cement on solidifying the sludge is not clear, but it is supposed that the calcium haloaluminate contained in rapid hardening cement neutralizes the poisoning action of the above organic substance; the inorganic compound of copper, lead, zinc and the like or the phosphorus compound on the setting of portland cement.

The rapid hardening cement clinker containing calcium haloaluminate can be usually manufactured by pulverizing the mixed raw materials containing an aluminous material, a calcareous material, a silicious material and a halogen compound and then calcining the mixture at 1265° – 1400°C and contains $11CaO \cdot 7Al_2O_3 \cdot CaX_2$, $3CaO \cdot SiO_2$ solid solution, $2CaO \cdot SiO_2$ solid solution and $2CaO \cdot Fe_2O_3 - 6CaO \cdot 2Al_2O_3 \cdot Fe_2O_3$ solid solution. The rapid hardening cement can be manufactured by adding anhydrite ($CaSO_4$) or anhydrite and gypsum semihydrate to the clinker thus obtained in order to retard the setting time and increase the early and long age strength, wherein the anhydrite is present in an amount such that the weight ratio of $Al_2O_3$ in the clinker to $SO_3$ in the anhydrite or the anhydrite and gypsum are present in an amount such that the $Al_2O_3/SO_3$ weight ratio in the cement thus produced is 0.4 – 1.8, or besides the rapid hardening cement thus produced is added an organic carboxylic acid, a boric acid or a borate, a bicarbonate, a silicate and a silicofluoride in order to retard furthermore the setting time. It is preferable to use rapid hardening cement containing 5 – 60% by weight, preferably 15 – 30% by weight of $11CaO \cdot 7Al_2O_3 \cdot CaX_2$ in this invention.

Since the amount of the rapid hardening cement containing calcium haloaluminate which is necessary to solidify the sludge differs with a kind of the substances contained in the sludge, an amount of water in the sludge or the strength of a solidified sludge, it is difficult to prescribe the adding amount of the rapid hardening cement; the rapid hardening cement are, however, usually added to the sludge with such an amount that the water/cement weight ratio is 0.8 – 2.5. For example, 1 m³ of the sludges having water/solid ratio 150 – 700% can be solidified by adding 50 – 350 kg of the above cement and the cohesive strength of the solidified sludges reaches about 2 – 8 t/m² by Vane test (about half value of one dimensional compressive strength).

It is preferable to minimize previously a quantity of water in the sludge to minimize the added amount of the rapid hardening cement from the economical point of view. It is unnecessary to analyze the sludge to identify the presence of an organic substance, an inorganic compounds of copper, lead, zinc and the like or a phosphorus compound, because the sludge containing the above substance can be solidified according to this invention.

For a more complete understanding of this invention, reference will now be made to several specific examples for carrying it out.

The physical and chemical properties of a rapid hardening cement and a normal portland cement used in the examples are shown in the following table.

| | Fineness (Blaine) cm²/g | Mineral Composition (%) | | | | | $Al_2O_3/SO_3$ |
|---|---|---|---|---|---|---|---|
| | | $C_{11}A_7CaF_2$ | $C_3S$ | $C_2S$ | $C_3A$ | $C_4AF$ | |
| Rapid Hardening Cement Containing Calcium Haloaluminate | 5300 | 20.6 | 50.7 | 1.7 | — | 4.7 | 1.1 |
| Normal | 3200 | 0.0 | 52.7 | 23.9 | 8.2 | 9.7 | 3.2 |

| | Fineness (Blaine) cm²/g | Mineral Composition (%) | | | | | $Al_2O_3/SO_3$ |
|---|---|---|---|---|---|---|---|
| | | $C_{11}A_7 \cdot CaF_2$ | $C_3S$ | $C_2S$ | $C_3A$ | $C_4AF$ | |
| Portland Cement | | | | | | | |

Note:
$C_{11}A_7 \cdot CaF_2$ is $11CaO \cdot 7Al_2O_3 \cdot CaF_2$
$C_3S$ is $3CaO \cdot SiO_2$
$C_2S$ is $2CaO \cdot SiO_2$
$C_3A$ is $3CaO \cdot Al_2O_3$
$C_4AF$ is $4CaO \cdot Al_2O_3 \cdot Fe_2O_3$

EXAMPLE 1

A sludge obtained from the bottom of the Tsusen river at Niigata (Japan) contained 25% of isohexane, 5% of alkylbenzensulphonate, a small amount of humic substances and had water/solid ratio 230% and cohesive strength by Vane test 0.01 t/m² and contained 55% of clay part, 15% of silt part and 30% of the other in the solid part.

100 kg of the sludge were put into a drum and mixed with an agitator for 2 minutes and then allowed to stand. The sludge was solidified at 10 minutes after putting into.

The cohesive strength of the solidified sludge showed 5 t/m² by Vane test at that time and then 11 t/m² after 1 month.

For the sake of comparison with the above result, the normal portland cement instead of the above rapid hardening cement was mixed with the sludge at the same rate as the above example and the mixture was allowed to stand. The sludge was not solidified at all for 50 hours.

EXAMPLE 2

105 kg of the rapid hardening cement containing calcium haloaluminate and 100 g of citric acid for 1 m³ of a following sludge were continuously mixed with 1000 m³ of the sludge (water/solid ratio 250%, cohesive strength by Vane test 0.02 t/m²) which contained 3% of dissolved sugars and 73% of silt clay, 0.5% of lead oxide, 1% of copper oxide and 25.5% of the other in solid part, and the mixture was filled in a reclaimed land. The reclaimed land having durability of 4 t/m² was made at 2 hours after filling.

For the sake of comparison with the above result, the normal portland cement instead of the above rapid hardening cement was mixed with the sludge at the same rate as the above example and the mixture was filled in the reclaimed land. The reclaimed land was not solidified at all at 52 hours after filling.

EXAMPLE 3

200 kg of the rapid hardening cement containing calcium haloaluminate per 1 m³ of a following drainage sludge were mixed with the drainage sludge (water/solid ratio 400%, cohesive strength by Vane test 0.02 t/m²), which contained dissolved polymerized phosphates such as $Na_5P_3O_{70}$ at the rate of 4.5 mg/l based on P in the phosphates and 45% of silt clay and 46% of excrements of human and animal, and the mixture was poured into a wooden mould (1m×1m×0.5m). After allowing to stand for 20 minutes, a solidified body having the cohesive strength by Vane test of 5 t/m² was obtained.

For the sake of comparison with the above result, the normal portland cement instead of the above rapid hardening cement was mixed with the sludge at the same rate as the above example and the mixture was poured into the same mould. The sludge was not solidified at all at 70 hours after pouring.

EXAMPLE 4

200 kg of the rapid hardening cement and 350 g of boric acid per 1 m³ of a following drainage sludge were mixed with the same drainage sludge as that in example 3. After the mixture was mixed for 10 minutes, the mixture was poured into the same frame as that in example 3. A solidified sludge having cohesive strength by Vane test of 5.3 t/m² was obtained at 1.5 hours after mixing.

For the sake of comparison with the above result, the normal portland cement instead of the above rapid hardening cement was mixed with the sludge at the same rate as the above example and the mixture was poured into the same mould. The sludge was not solidified at all at 70 hours after mixing.

What is claimed is:
1. A method for solidifying a sludge having a high water/solid ratio and containing a substance having a harmful influence upon the setting of portland cement, where said sludge is:
   1. a sand, a silt, a clay or colloidal particles which contain a sugar, a chloride or a hydroxide of copper, lead or zinc; a phosphoric acid; an inorganic phosphate or an organic phosphorous compound or
   2. a mud which contains substances discharged from a metal mine, said method comprising mixing the sludge and rapid hardening cement containing clinker consisting of 5 – 60% by weight of $11CaO \cdot 7Al_2O_3 \cdot CaX_2$; and $3CaO \cdot SiO_2$ solid solution, $2CaO \cdot SiO_2$ solid solution and $2CaO \cdot Fe_2O_3$ — $6CaO \cdot 2Al_2O_3 \cdot Fe_2O_3$; and anhydrite or anhydrite and gypsum semihydrate in an amount such that the weight ratio of $Al_2O_3/SO_3$ in the cement is 0.4 – 1.8 and the weight ratio of water in the sludge to the cement is 0.8 – 2.5.

2. The method as claimed in claim 1, wherein the rapid hardening cement contains 15 – 30% by weight of $11CaO \cdot 7Al_2O_3 \cdot CaX_2$.

3. The method as claimed in claim 1, wherein an organic carboxylic acid, a boric acid or a borate, a bicarbonate, a silicate and a silicofluoride is mixed with the rapid hardening cement in order to retard furthermore the setting time of cement thus produced.

* * * * *